US 9,403,455 B2

United States Patent
Degenkolb

(10) Patent No.: US 9,403,455 B2
(45) Date of Patent: Aug. 2, 2016

(54) ADJUSTABLE ARMREST DEVICE FOR SECURING IN A CUP HOLDER OF A VEHICLE

(71) Applicant: FORD GLOBAL TECHNOLOGIES, LLC, Dearborn, MI (US)

(72) Inventor: Jay Robert Degenkolb, Rockwood, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/491,342

(22) Filed: Sep. 19, 2014

(65) Prior Publication Data

US 2016/0082868 A1 Mar. 24, 2016

(51) Int. Cl.
*B60N 2/46* (2006.01)
*A47C 7/54* (2006.01)

(52) U.S. Cl.
CPC ............ *B60N 2/4673* (2013.01); *B60N 2/4686* (2013.01); *A47C 7/54* (2013.01)

(58) Field of Classification Search
CPC .... B60N 2/4686; B60N 2/466; B60N 2/4673; B60R 7/04; B60R 7/043; A47C 7/68; A47C 7/546
USPC ............ 297/411.36, 411.26, 188.19, 411.23, 297/440.1, 188.09, 461, 188.18, 411.21, 297/411.46, 411.24; 224/275, 542, 544; 248/118.5; 296/37.8; 135/76; 220/288, 220/23.91, 703
See application file for complete search history.

(56) References Cited

U.S. PATENT DOCUMENTS

| 3,068,048 | A | * | 12/1962 | Mahon et al. ............. 297/188.15 |
| 3,206,249 | A | * | 9/1965 | Gateley .................. A47C 7/546 108/154 |
| 4,798,413 | A | * | 1/1989 | Capelli .................... A47C 7/70 108/26 |
| 4,998,770 | A | | 3/1991 | Shimizu et al. |
| 5,085,481 | A | * | 2/1992 | Fluharty et al. .............. 296/37.8 |
| 5,180,088 | A | * | 1/1993 | de Angeli ............... B60N 3/102 220/703 |
| 5,281,001 | A | * | 1/1994 | Bergsten ............ A47B 21/0371 248/118 |
| 5,382,079 | A | * | 1/1995 | Wilson et al. ............. 297/411.36 |
| 5,749,629 | A | * | 5/1998 | Heath .................. B60N 2/4606 248/631 |
| 6,419,314 | B1 | | 7/2002 | Scheerhorn |
| 7,478,867 | B2 | * | 1/2009 | Weng ....................... A47C 7/70 297/161 |
| 7,810,862 | B2 | | 10/2010 | Smith |
| 8,215,688 | B2 | | 7/2012 | Hipshier et al. |
| 8,888,188 | B2 | * | 11/2014 | Moffat ................. A41D 13/065 297/423.11 |
| 2005/0168044 | A1 | * | 8/2005 | Laske, Jr. ............. A47C 16/005 297/452.29 |

(Continued)

FOREIGN PATENT DOCUMENTS

GB 2468565 A 9/2010
JP 05139198 A * 6/1993

(Continued)

OTHER PUBLICATIONS

English machine translation for JP2000301987, Dated Jul. 23, 2014.

(Continued)

*Primary Examiner* — Milton Nelson, Jr.
(74) *Attorney, Agent, or Firm* — Vichit Chea; King & Schickli, PLLC

(57) ABSTRACT

An adjustable armrest device is provided for securing in a cup holder of a vehicle. The device includes a pedestal, an armrest and a connecting structure for adjustably securing the armrest to the pedestal.

6 Claims, 3 Drawing Sheets

(56) References Cited

U.S. PATENT DOCUMENTS

| | | |
|---|---|---|
| 2005/0225130 A1 | 10/2005 | Kobayashi et al. |
| 2006/0279123 A1 | 12/2006 | Bazinski et al. |
| 2010/0078432 A1* | 4/2010 | Lin .......................... 220/23.91 |
| 2012/0068025 A1* | 3/2012 | Polli .................. A47B 21/0314 248/118 |
| 2012/0181837 A1* | 7/2012 | Meador ................. A47C 7/546 297/411.23 |
| 2013/0234463 A1 | 9/2013 | Vasko et al. |

FOREIGN PATENT DOCUMENTS

| | | |
|---|---|---|
| JP | H07300046 A | 11/1995 |
| JP | 2000301987 A | 10/2000 |

OTHER PUBLICATIONS

English machine translation for JPH07300046, Dated Jul. 23, 2014.

* cited by examiner

ADJUSTABLE ARMREST DEVICE FOR SECURING IN A CUP HOLDER OF A VEHICLE

TECHNICAL FIELD

This document relates generally to the vehicle equipment field and, more particularly, to an adjustable armrest device that is secured in a cup holder of a vehicle.

BACKGROUND

Many vehicles today are equipped with stationary center console armrests to support the driver's elbow. Many others allow for limited fore/aft adjustment of the armrest.

Multiple factors affect the placement of a driver's elbow on the center console armrest. Body proportions (e.g. long/short arms, long/short legs, torso length and the like) and vehicle seat structures (manual vs. power seat) are just some of the variables that affect perceived seated comfort. As a result of these variables, many center console armrests in today's vehicles are not effectively positioned to engage the driver's elbow and provide the best ergonomics.

This document relates to an adjustable armrest device of relatively simple structure that is inexpensive to manufacture and provides enhanced adjustability including both fore/aft adjustment and height adjustment. This additional adjustability allows the device to be more effectively positioned for the comfort of the vehicle operator. Further, the armrest device is easily adapted for use in a multitude of vehicles with various center console designs.

SUMMARY

In accordance with the purposes and benefits described herein, an adjustable armrest device is provided. The adjustable armrest device is secured in a cup holder of the vehicle. The device comprises a pedestal, an armrest and a connecting structure for adjustably securing the armrest to the pedestal.

More specifically, the pedestal includes a tapered cylindrical sidewall including a first end having a diameter $D_1$ and a second end having a diameter $D_2$ where $D_1 < D_2$. Further the first end is closed. The armrest includes a base, a pad or cushion supported on the base and a mounting stem projecting from the base. The connecting structure comprises mating threads on the second end of the tapered cylindrical sidewall and the mounting stem.

In one possible embodiment, the base is arcuate. Further the pad or cushion has a longitudinal axis and is arcuate along the longitudinal axis so as to provide a bowed support surface for the elbow of the vehicle operator or occupant of the front passenger seat.

As should be further appreciated, the pedestal includes a storage compartment defined by the cylindrical sidewall and the closed first end. The mounting stem of the armrest closes that storage compartment at the second or upper end.

In accordance with an additional aspect a method is provided of equipping a vehicle with an armrest. That method comprises the steps of providing a cup holder in a console of the vehicle and providing an armrest device having a cushion supported on a pedestal that is sized and shaped to be snuggly received and securely held in the cup holder. In addition, the method includes the step of providing an adjustable connection between the pedestal and the cushion of the armrest to provide for height adjustment.

In the following description, there is shown and described a preferred embodiment of the adjustable armrest device. As it should be realized, the armrest device is capable of other, different embodiments and its several details are capable of modification in various, obvious aspects all without departing from the armrest device as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the armrest device and together with the description serve to explain certain principles thereof. In the drawing.

Reference will now be made in detail to the present preferred embodiment of the armrest device, an example of which is illustrated in the accompanying drawing figures.

DETAILED DESCRIPTION

Figure 1:
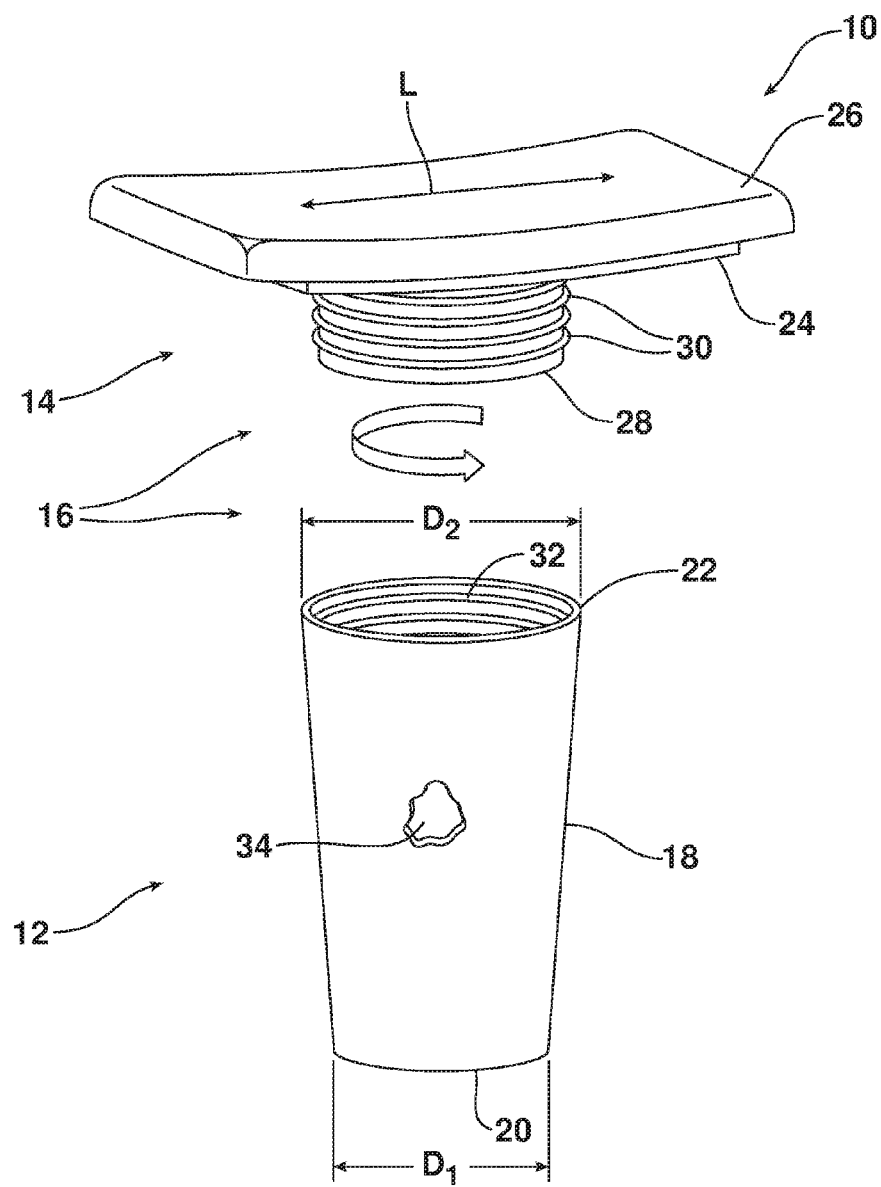
FIG. 1 is an exploded perspective view of the adjustable armrest device.

Reference is now made to FIG. 1 illustrating the adjustable armrest device 10 which includes a pedestal 12, an armrest 14 and a connecting structure 16. As illustrated the pedestal 12 includes a cylindrical sidewall 18 having a first end 20 and a second end 22. The first end 20 has a diameter $D_1$ and a second end 22 has a diameter $D_2$ wherein $D_1 < D_2$ so that the cylindrical sidewall 18 is tapered.

More specifically, the first end 20 has a diameter of between about 68 mm and about 70 mm. The second end 22 has a diameter $D_2$ of between about 82 mm and about 84 mm. Advantageously, the resulting tapered sidewall 18 allows the pedestal 12 to be properly received and snugly fit in the cup holder $H_1$ or $H_2$ of a vehicle as will be described in greater detail below.

The armrest 14 includes a base 24, a pad or cushion 26 having a length L that is supported on the upper surface of the base and a mounting stem 28 that projects from a lower surface of the base. As should be appreciated, the connecting structure 16 comprises a first set of threads 30 on the stem 28 and a second, cooperating set of threads 32 on the second end 22 of the pedestal 12 along the inner surface of the cylindrical sidewall 18. Thus the armrest 14 is secured to the pedestal 12 by aligning the stem 28 over the second end 22 of the pedestal 12 and then screwing the armrest onto the pedestal. By screwing the armrest 14 further into the pedestal 12, the effective height of the adjustable armrest device 10 is lowered. In contrast, by unscrewing the armrest 14 from the pedestal 12, the effective height of the armrest device 10 is raised.

As should also be appreciated, in one possible embodiment, the first end 20 of the pedestal 12 is closed and an interior compartment 34 is formed in the pedestal by the closed first end and the cylindrical sidewall 18. As should be appreciated, when the armrest 14 is secured to the pedestal 12, the stem 28 closes the second end 22 of the pedestal thereby enclosing the storage compartment 34.

If desired, the pedestal 12 may be molded or made from a transparent material allowing one to view the contents of the interior compartment 34 from the outside. Alternatively, the pedestal may be molded or made from opaque material if desired thereby hiding the contents of the compartment 34 from view.

Figure 2:
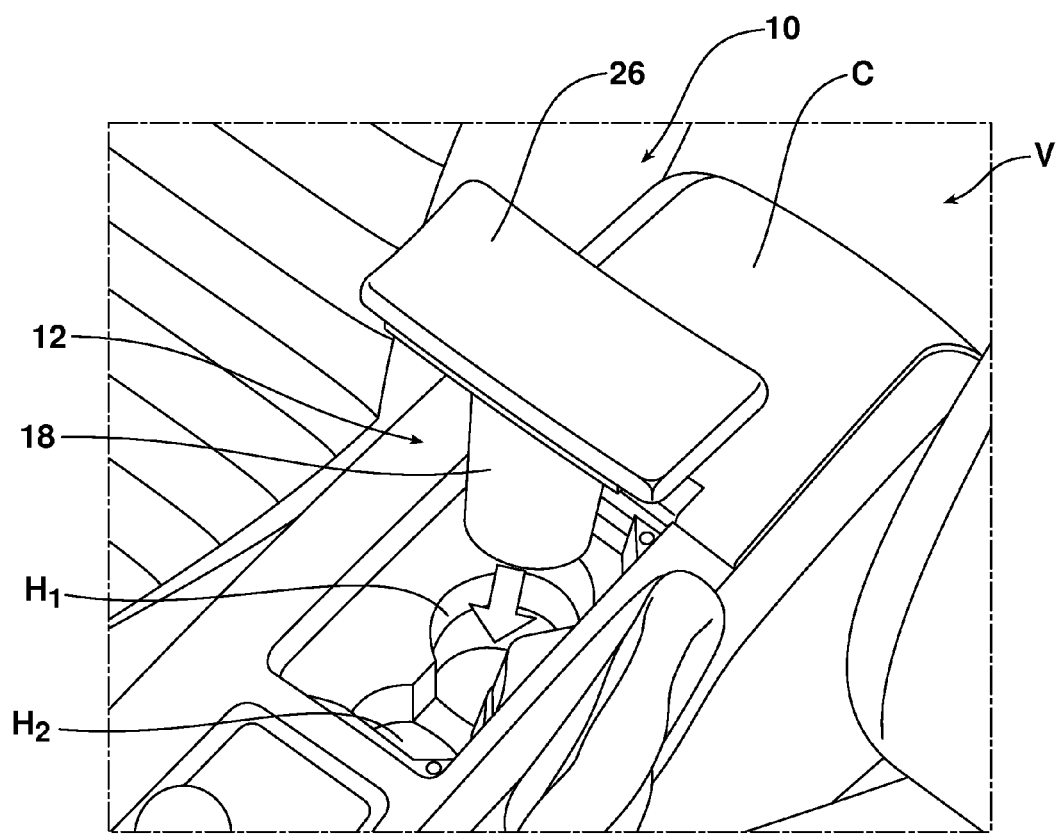
FIG. 2 is a top plan view illustrating positioning of the device of FIG. 1 in the rearmost cup holder of the front console of a vehicle.

Reference is now made to FIG. 2 illustrating the front console C of a vehicle V. As illustrated, the console C incorporates two cup holders with cup holder $H_1$ aft of cup holder $H_2$. As illustrated, the adjustable armrest device 10 is assembled and the pedestal 12 is inserted into the desired cup holder $H_1$ or $H_2$ (note action arrow in FIG. 2). More specifically, the tapered cylindrical sidewall 18 of the pedestal 12 is sized and shaped to be snugly received and securely held in either of the cup holders $H_1$, $H_2$. As should be further appreciated, the ability of the armrest device 10 to be inserted, received and held in either of the cup holders $H_1$, $H_2$ provides fore/aft adjustability for the positioning of the pad or cushion 26 where it can provide the best ergonomics and comfort for the vehicle operator or occupant. As noted above, the height of the pad or cushion 26 may also be adjusted by screwing the armrest 14 further into the pedestal 12 to lower the cushion or unscrewing the armrest from the pedestal to raise the cushion. Further, the armrest 14 may be turned in the pedestal 12 in order to allow clearance to operate the parking brake lever P if required.

As should be further appreciated, the base 24 of the device 10 illustrated in the drawing the figures is arcuate. Similarly, the cushion 26 has a longitudinal axis L and is arcuate along the longitudinal axis so as to provide a bowed support surface. As should be appreciated, the lowermost portion of that surface is at the center of the cushion so that the cushion forms a trough that tends to comfortably hold the elbow of the vehicle operator/occupant in place when it is supported by the device 10.

Figure 3:
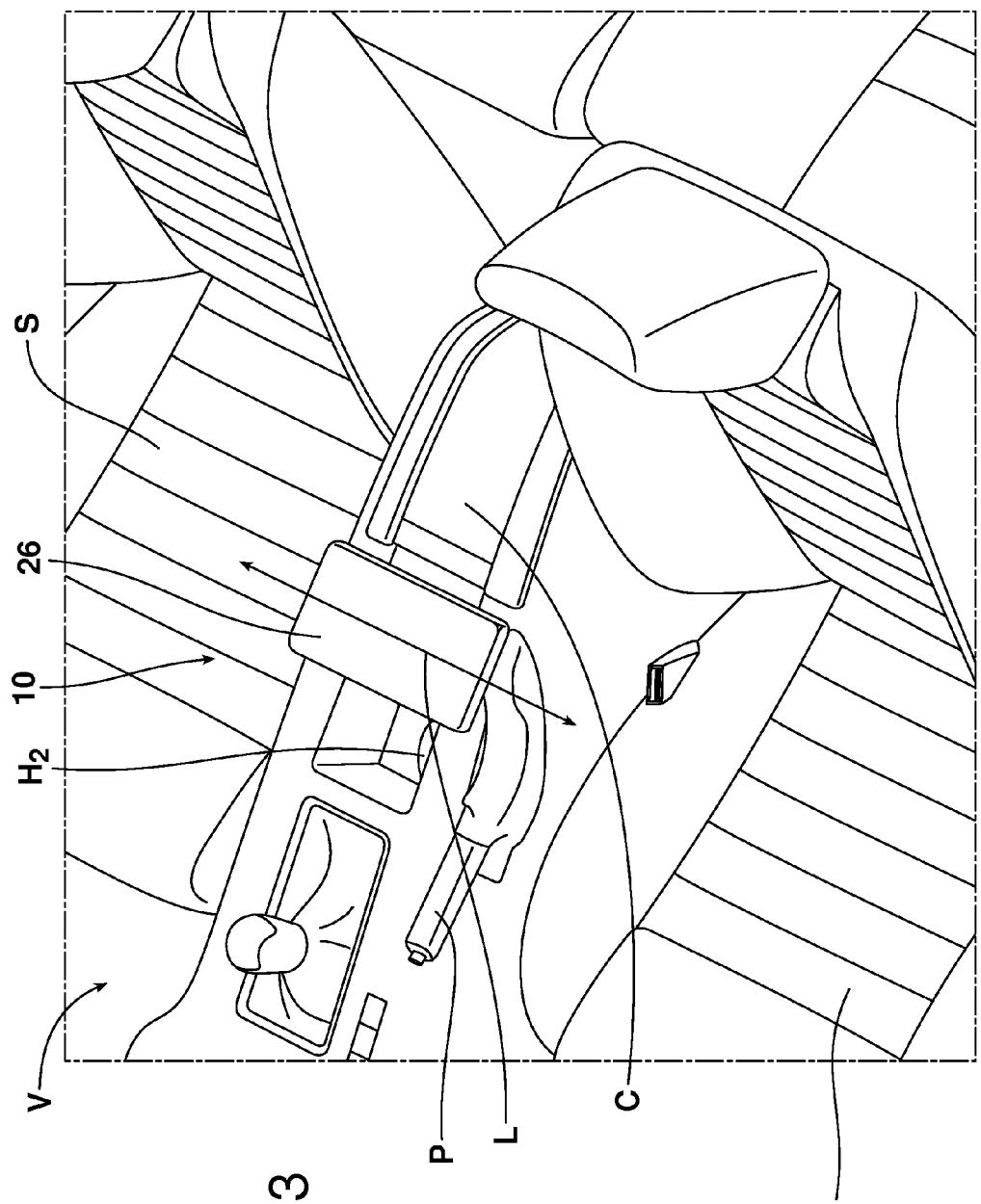
FIG. 3 is a perspective view illustrating the device of FIG. 1 mounted in the rearmost cup holder of the front console of a vehicle with the surface of the armrest pad or cushion oriented to support the elbow of the vehicle operator or front passenger.

While the device 10 is illustrated in FIG. 3 with the longitudinal axis of the cushion 26 extends transversely across the vehicle V between the front seats S, it should be appreciated that the armrest 14 could be rotated 90° to reorient the longitudinal axis of the cushion with the longitudinal axis of the vehicle so that the cushion extends along the length of the console C. Of course, the possible adjustments do not end there as the longitudinal axis of the cushion may be oriented anywhere in-between these two possible positions as well including angled slightly toward the vehicle operator so that the trough formed by the cushion 26 is aligned with the forearm as it extends from the elbow resting on the cushion 26 toward the steering wheel of the vehicle V.

In summary, numerous benefits are provided by the adjustable armrest device 10. As should be appreciated, the device is of relatively simple and inexpensive construction. If desired the entire device may be molded from an appropriate plastic, polymeric or composite material. The device 10 may also be utilized without modification in substantially any vehicle incorporating a center console C with a cup holder $H_1$ or $H_2$. Thus, it may be used in more than one vehicle due to this great versatility. This increases the utility of the device 10.

Perhaps most significantly, the device 10 provides three degrees of freedom (i.e. fore/aft adjustment between cup holders $H_1$, $H_2$, height adjustment of the cushion 26 by screwing or unscrewing the armrest 14 in the pedestal 12 and angular orientation of the cushion also by screw adjustment). As a result, the vehicle operator or occupant may position the cushion 26 for maximum comfort in a manner not possible with armrest devices of the prior art.

The foregoing has been presented for purposes of illustration and description. It is not intended to be exhaustive or to limit the embodiments to the precise form disclosed. Obvious modifications and variations are possible in light of the above teachings. For example, while the cushion 26 in the illustrated embodiment is rectangular in shape and arched or bowed so as to form an elbow supporting trough in the upper surface thereof, it should be appreciated that the cushion may assume a different shape and/or contour. All such modifications and variations are within the scope of the appended claims when interpreted in accordance with the breadth to which they are fairly, legally and equitably entitled.

What is claimed:

1. An adjustable armrest device for securing in a cup holder of a vehicle, comprising:
    a pedestal, wherein said pedestal includes a tapered cylindrical sidewall, wherein said tapered cylindrical sidewall has a first end having a diameter ($D_1$) and a second end having a diameter ($D_2$) where $D_1 < D_2$ and said first end is closed;
    an armrest, wherein said armrest includes a base and a mounting stem, said mounting stem secured to a first side of said base and a cushion secured to a second side of said base; and
    a connecting structure for adjustably securing said armrest to said pedestal via a threaded connection, wherein said connecting structure includes mating threads on said second end of said tapered cylindrical sidewall and said mounting stem.

2. The device of claim 1, wherein said diameter ($D_1$) at said first end of said tapered cylindrical sidewall is between about 68 mm and about 70 mm so as to be properly received in the cup holder of the vehicle.

3. The device of claim 2, wherein said diameter ($D_2$) at said second end of said tapered cylindrical sidewall is between about 82 mm and about 84 mm.

4. The device of claim 1, wherein a closed storage compartment is defined in said pedestal by said tapered cylindrical sidewall, said closed first end and said armrest secured in said second end.

5. The device of claim 4, wherein said base is arcuate.

6. The device of claim 5, wherein said cushion has a longitudinal axis and said cushion is arcuate along said longitudinal axis so as to provide a bowed support surface.

* * * * *